(No Model.)
H. A. SEYMOUR.
INCANDESCENT LAMP.
No. 261,263. Patented July 18, 1882.
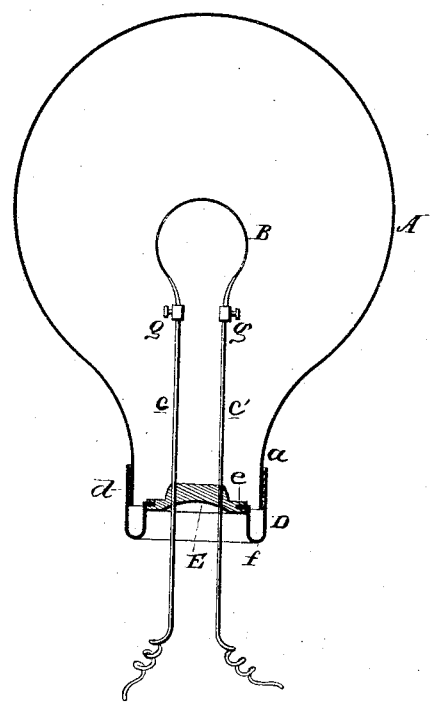
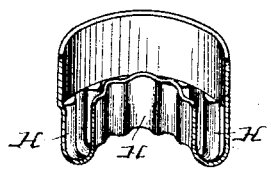
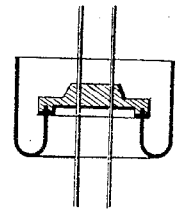
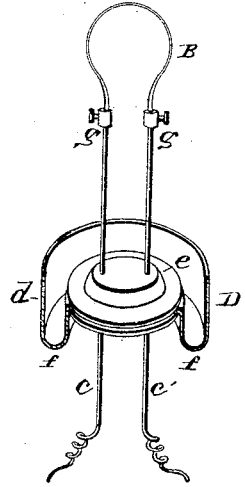
WITNESSES
E. I. Nottingham
Herman Moran
INVENTOR
Henry A. Seymour

UNITED STATES PATENT OFFICE.

HENRY A. SEYMOUR, OF WASHINGTON, DISTRICT OF COLUMBIA, ASSIGNOR TO GEORGE W. STOCKLY, OF CLEVELAND, OHIO.

INCANDESCENT LAMP.

SPECIFICATION forming part of Letters Patent No. 261,263, dated July 18, 1882.

Application filed December 16, 1881. (No model.)

*To all whom it may concern:*

Be it known that I, HENRY A. SEYMOUR, of Washington, in the District of Columbia, have invented certain new and useful Improvements in Incandescent Lamps; and I do hereby declare the following to be a full, clear, and exact description of the invention, such as will enable others skilled in the art to which it pertains to make and use the same.

My invention relates to an improvement in incandescent lamps.

One of the admitted obstacles to the successful introduction of incandescent lighting up to the present time is the great expense incurred in keeping the lamps in condition for use. The globes of such incandescent lamps as are in use are made of very thin and fragile glass, and ordinarily the conducting-wires are sealed therein. When the lamps are in operation the globes become heated more or less, and in the event that a draft of cold air is allowed to suddenly come in direct contact with one side of the globe the unequal strain on the parts of the globe, due to uneven contraction, operates in many instances to shiver the globe in pieces, and thus completely destroy the lamp. Again, when the conducting-wires are sealed into the globe the latter is often broken, owing to the strain to which it is subjected, owing to the fact that it does not expand and contract in unison with the expansion and contraction of the conducting-wires. Again, in incandescent lamps having the conducting wires sealed into the glass globe the carbons or burners soon become disintegrated or broken, and after a comparatively short time the lamps must be taken out and replaced by new ones. One prominent cause for the breakage of the carbon or burner is the strain to which it is subjected by reason of the expansion and contraction of the conducting-wires to which the carbon is attached. If one wire does not expand and contract in exact unison with the other wire, the carbon is subjected to a transverse breaking strain in one direction as the conducting-wires expand and in the opposite direction as they contract. As the carbons or burners are necessarily very fragile, in order that they may offer sufficient resistance to the current to render them incandescent, they will be broken in twain after having been in use a comparatively short time, by reason of the constant breaking strains to which they are subjected by the unequal expansion and contraction of the conducting-wires, as hereinbefore explained. The breaking of the carbon renders the lamp valueless, and when the conducting-wires are sealed into the glass globe but an insignificant portion of the lamp can be again utilized in a new lamp. Hence the great expense that is necessarily incurred in operating this type of incandescent lamps.

The object of my invention is to obviate the defects above noted, and to provide for the expansion and contraction of the glass bulb or globe and prevent it from breaking when subjected to drafts of cold air, or by reason of the unequal expansion and contraction of the conducting-wires as compared with the expansion and contraction of the globe itself.

A further object of my invention is to prevent the breaking of the carbons or burners by providing against any undue expansion or contraction of the conducting-wires inside of the globe or bulb.

With these ends in view my invention consists essentially in the combination, with the transparent globe or bulb and conducting-wires of an electric lamp, of a yielding disk hermetically sealed to the neck of the bulb, and a non-conducting button secured to said disk, through which pass and are sealed the conducting-wires.

My invention further consists in certain other features of construction and combination of parts, as will hereinafter be described, and pointed out in the claims.

In the accompanying drawings, Figure 1 is a vertical section of an electric lamp embodying my invention. Fig. 2 is a detached view of the stopper or disk, the non-conducting button, conducting-wires, and carbon or burner; and Figs. 3 and 4 are modifications.

A designates the transparent bulb or globe, usually made of glass, and provided with the neck $a$, through which the burner or carbon B and its supporting-conductors $c$ $c'$ are inserted.

D is a disk of thin sheet metal, preferably brass or steel, though it may be made of platinum or any other suitable metal, having its outer periphery or margin bent or struck up to form a collar, d, which encircles the neck of the bulb, and is hermetically sealed thereto in any suitable manner. An aperture, e, round, square, or other form, is formed at the center of the disk, in which is inserted and hermetically sealed a button or disk, E, of glass or other non-conducting substance which is impervious to air, and around the central aperture an annular corrugation, f, (one or more) is formed in the disk for the purpose of allowing it to contract and expand.

The conductors c c' are passed through suitable apertures in the button or disk E, and are hermetically sealed therein, the burner or carbon B being secured to the inner tips or ends of these conductors by clamps g, or in any other suitable manner. When the bulb and its closing disk or head become heated the elasticity of the disk permits either to expand without reference to the heat expansion of the other, and they may also contract independently on becoming cooled, so that the danger of breaking the bulb is practically obviated. The heat transmitted from the burner to the supporting-conductors is transmitted to the button E, and from thence to the yielding disk, wherein the heat will be diffused and a considerable portion radiated, so that much less heat will be imparted to the globe than is the case when the conductors are sealed directly within the neck of the globe. As the metal disk absorbs a considerable portion of the heat transmitted to the conductors, the degree of expansion and contraction of the latter is much lessened, and, owing to the fact that the metal disk is capable of yielding, its contraction and expansion will operate to slightly raise and lower the burner without subjecting it to a breaking strain.

The glass button or disk may be of any desired size, but is preferably of nearly the same diameter as the neck of the globe, in order that it may constitute a transparent stopper or head for the globe, and hence not intercept the downward rays of light.

Fig. 3 shows a metal disk having radial corrugations h to give it increased capacity for expanding and contracting.

Fig. 4 shows the non-conducting button having the disk secured to its under side, instead of being secured to its edge.

When the burner or carbon becomes ruptured or broken, and is thus rendered inoperative, the metal disk may be removed from the neck of the globe, the old carbon removed and replaced by a new one, and the metal disk again secured to the neck of the globe, thus enabling the carbons to be renewed at slight expense.

It is evident that many slight changes in the form, construction, and relative arrangement of parts might be resorted to without involving a departure from the spirit of my invention, and hence I would have it understood that I do not restrict myself to the exact form, construction, and arrangement of parts shown and described; but, Having fully described my invention, what I claim as new, and desire to secure by Letters Patent, is—

1. The combination, with the vacuum bulb or globe of an electric lamp and the conductors for supporting the carbon or burner of a yielding disk hermetically sealed to the neck of the bulb, and a non-conducting disk or button secured within an aperture in said yielding disk, the conductors being sealed within said button, substantially as set forth.

2. The combination, with the vacuum bulb or globe of an electric lamp and the conductors for supporting the burner, of a yielding disk hermetically sealed to the neck of the bulb, and a glass button secured within an aperture in said yielding disk, the conductors being sealed within said glass button or disk, substantially as set forth.

3. The combination, with the bulb, of a corrugated metal disk sealed to the neck of the globe, and provided with the non-conducting button for supporting the conductors, substantially as set forth.

In testimony whereof I have signed this specification in the presence of two subscribing witnesses.

HENRY A. SEYMOUR.

Witnesses:
HERMAN MORAN,
E. I. NOTTINGHAM.